(12) United States Patent
Meyers et al.

(10) Patent No.: US 8,733,709 B2
(45) Date of Patent: May 27, 2014

(54) TWO SHOT TUBE RETENTION FASTENER WITH ANTI MATERIAL PEELING FEATURE

(75) Inventors: Jason A. Meyers, Shelby Township, MI (US); Roger E. Pilon, New Baltimore, MI (US); Sean A. Tomaselli, Windsor, CA (US)

(73) Assignee: Black & Decker Inc., Newark, DE (US)

( * ) Notice: Subject to any disclaimer, the term of this patent is extended or adjusted under 35 U.S.C. 154(b) by 112 days.

(21) Appl. No.: 13/324,079

(22) Filed: Dec. 13, 2011

(65) Prior Publication Data

US 2013/0146720 A1 Jun. 13, 2013

(51) Int. Cl.
*F16L 3/08* (2006.01)

(52) U.S. Cl.
USPC .......................... 248/65; 248/68.1; 248/74.2

(58) Field of Classification Search
USPC ................. 248/49, 65, 67.7, 68.1, 74.1, 74.2, 248/230.1, 230.6, 231.71; 24/336, 339
See application file for complete search history.

(56) References Cited

U.S. PATENT DOCUMENTS

| | | | |
|---|---|---|---|
| 4,467,988 A | 8/1984 | Kraus | |
| 4,614,321 A | 9/1986 | Andre | |
| 5,257,768 A | 11/1993 | Juenemann et al. | |
| 5,460,342 A | 10/1995 | Dore et al. | |
| 5,464,179 A | 11/1995 | Ruckwardt | |
| 6,152,406 A | 11/2000 | Denndou | |
| 6,809,257 B2 | 10/2004 | Shibuya | |
| 6,883,762 B2 * | 4/2005 | Miura et al. | 248/74.2 |
| 6,926,237 B2 | 8/2005 | Shereyk et al. | |
| 7,011,277 B2 | 3/2006 | Mizukoshi et al. | |
| 7,201,351 B2 | 4/2007 | Stigler | |
| 7,201,352 B2 | 4/2007 | Kawai | |
| 7,207,528 B2 | 4/2007 | Kato | |
| 7,267,307 B2 | 9/2007 | Bauer | |
| 7,278,190 B2 | 10/2007 | Fischer et al. | |
| 7,600,725 B2 | 10/2009 | Mizukoshi | |
| 7,658,350 B2 | 2/2010 | Bauer | |
| 8,020,812 B2 | 9/2011 | Matsuno et al. | |
| 2004/0188570 A1 | 9/2004 | Bauer | |
| 2004/0217236 A1 * | 11/2004 | Shibuya | 248/68.1 |
| 2004/0217314 A1 | 11/2004 | Burian et al. | |
| 2005/0067548 A1 | 3/2005 | Inoue | |
| 2005/0098688 A1 | 5/2005 | Miarka et al. | |
| 2005/0116122 A1 | 6/2005 | Nakanishi | |
| 2006/0273226 A1 | 12/2006 | Jatzke | |
| 2010/0025272 A1 | 2/2010 | Stau et al. | |
| 2010/0207001 A1 | 8/2010 | Smith et al. | |

FOREIGN PATENT DOCUMENTS

WO WO 2011/028705 3/2011

* cited by examiner

*Primary Examiner* — Alfred J Wujciak
(74) *Attorney, Agent, or Firm* — Harness, Dickey & Pierce, P.L.C.

(57) ABSTRACT

A tube retention fastener includes a polymeric material body having first and second walls and a semi-circular sleeve defining a longitudinal cavity. First and second deflecting wings individually connected to one of the first or second walls are directed toward a longitudinal axis of the longitudinal cavity in a non-deflected condition. An elastically resilient material isolation member includes a first portion fixed to the semi-circular sleeve, and first and second contact ends fixed to the first and second deflecting wings. Isolation member free extending portions are positioned and freely extend between the first portion and the contact ends. First and second wing receiving cavities are created between the deflecting wings and the first and second walls in the non-deflected condition. The deflecting wings, the contact ends and the free extending portions elastically deflect into one of the wing receiving cavities when a tube is positioned between the deflecting wings.

20 Claims, 10 Drawing Sheets

TWO SHOT TUBE RETENTION FASTENER WITH ANTI MATERIAL PEELING FEATURE

FIELD

The present disclosure relates to fasteners used in automobile vehicle service to retain and route tubing and electrical wiring.

BACKGROUND

This section provides background information related to the present disclosure which is not necessarily prior art.

Clips and fasteners are known which are used to retain tubular shaped objects such as metal or rubber tubing used for hydraulic, vacuum, fuel and similar services, and electrical wires, cables, and wire bundles in automobile vehicles. Vibration and sound transmitted from an upstream or downstream component of the vehicle can be transferred through the fastener to the body panel to which the fastener is connected, thereby inducing unwanted noise. Resilient material inserts provided with these fasteners reduce noise transmission. To allow the tubular shaped object to be inserted into the fastener, the resilient insert material is either locally omitted in areas where the fastener material deflects during insertion, or the resilient insert material is either crushed or can peel away during insertion. Known designs therefore provide less than optimum coverage of the resilient insert material in contact with the tubular shaped object after the tubular shaped object is installed.

SUMMARY

This section provides a general summary of the disclosure, and is not a comprehensive disclosure of its full scope or all of its features.

According to several embodiments of the present disclosure, a tube retention fastener includes a body of a polymeric first material. The body includes first and second walls and a semi-circular sleeve defining a longitudinal cavity. Body first and second deflecting wings are individually connected to one of the first or second walls and are directed toward a longitudinal axis of the longitudinal cavity in a non-deflected condition. An isolation member of an elastically resilient second material includes a first portion fixed to the semi-circular sleeve and first and second contact ends individually fixed to one of the first and second deflecting wings. Isolation member first and second free extending portions are each positioned between and freely extend between the first portion and one of the first and second contact ends.

According to further embodiments, a tube retention fastener includes a body of a polymeric first material. The body includes first and second walls and a semi-circular sleeve defining a longitudinal cavity. First and second deflecting wings are individually connected to one of the first or second walls, each having a free end directed toward a longitudinal axis of the longitudinal cavity in a non-deflected condition. An isolation member of an elastically resilient second material includes a first portion fixed to the semi-circular sleeve and a plurality of longitudinal resilient ribs directed toward the longitudinal cavity and located only in the first portion. Isolation member first and second free extending portions each freely extend from the first portion and are fixed to the free end of one of the first or second deflecting wings.

According to other embodiments, a tube retention fastener, includes a body of a polymeric first material. The body includes first and second walls and a semi-circular sleeve defining a longitudinal cavity. Body first and second deflecting wings are individually integrally connected to one of the first or second walls, each having a free end directed toward a longitudinal axis of the longitudinal cavity in a non-deflected condition. A first wing receiving cavity is created between the first deflecting wing and the first wall, and a second wing receiving cavity is created between the second deflecting wing and the second wall in the non-deflected condition. An isolation member of an elastically resilient second material has a first portion fixed to the semi-circular sleeve and first and second contact ends individually fixed to one of the first and second deflecting wings. Isolation member first and second free extending portions each freely extend from the first portion and are fixed to one of the first and second contact ends at the free end of one of the first or second deflecting wings. The first free extending portion and the first deflecting wing are elastically deflected into the first wing receiving cavity in a deflected condition, and the second free extending portion and the second deflecting wing are elastically deflected into the second wing receiving cavity in the deflected condition.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
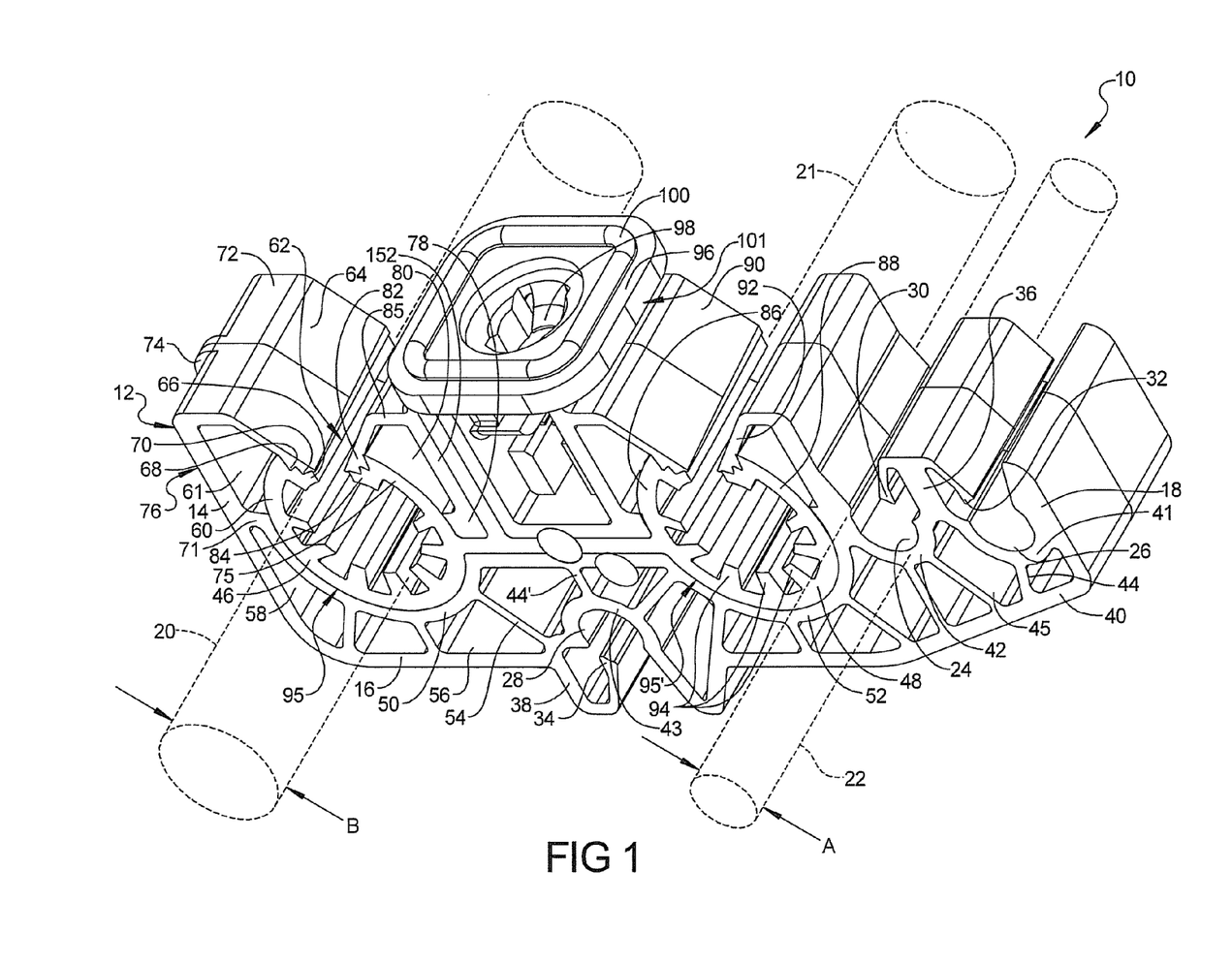
FIG. 1 is a right front perspective view of a tube retention fastener according to the present disclosure.

Referring to FIG. 1, a tube retention fastener 10 includes a body 12 of a first polymeric material such as polyamide or polyoxymethylene to provide stiffness. Body 12 includes a first end wall 14, a bottom wall 16 and a second end wall 18. Tube retention fastener 10 is adapted to retain at least one and according to several embodiments first, second and/or third tubular-shaped objects or tubes 20, 21, 22, such as hydraulic fluid, fuel, vacuum or similar automobile vehicle service tubing, or one or more electrical wires, cables or wireways, collectively referred to hereinafter as "tubes". Third tubes 22 are received in direct contact with material of body 12 in first, second and/or third retention cavities 24, 26, 28 created in body 12. Third tubes 22 are retained within first, second and/or third retention cavities 24, 26, 28 using first, second, and/or third retention arms 30, 32, 34 created from material of body 12 which elastically deflect to permit installation of third tubes 22, and elastically return to the non-deflected positions shown for retention. First and second retention arms 30, 32 can be together connected to body 12 using a first retention arm support member 36 positioned proximate to second end wall 18. Third retention arm 34 of third retention cavity 28 is connected to bottom wall 16 using a second retention arm support member 38 extending away from bottom wall 16.

A bottom wall extending portion 40 can be angularly oriented with respect to bottom wall 16 because the size of third tubes 22 supported in first and/or second retention cavities 24, 26 are smaller than first and second tubes 20, 21, therefore permitting the longitudinal axes of first, second and third tubes 20, 21 and 22 (except for third tube 22 retained within third retention cavity 28) to be aligned co-planar with each other and equally spaced from bottom wall 16. Each of the first and second retention cavities 24, 26 are created in body 12 as a semi-circular shaped sleeve such as semi-circular shaped sleeves 41, 42. Each of the semi-circular shaped sleeves 41, 42 is rigidly connected to bottom wall extending portion 40 using a plurality of webs 44. Similarly, third retention cavity 28 is created in body 12 as a semi-circular shaped sleeve 43. Semi-circular shaped sleeve 43 is rigidly connected to bottom wall 16 using a plurality of webs 44'. Webs 44, 44' define a plurality of body cavities 45 between any two webs or between a web and one of the first or second end walls 14, 18 or bottom wall 16.

During use, first and/or second tubes 20, 21 can transfer vibration, sound, and/or motion, collectively hereinafter referred to as "noise", from upstream or downstream vehicle components or equipment to the vehicle body structure to which tube retention fastener 10 is connected (shown and described as panel 110 in reference to FIG. 2), therefore, first and second tubes 20, 22 are further supported in tube retention fastener 10 using elastically deflectable, resilient material first and second isolation members 46, 48 which are fixed to first and second semi-circular shaped sleeves 50, 52 created in body 12. The material of first and second isolation members 46, 48 can be TPE (thermoplastic elastomer). A difference in durometer hardness and density between body 12 and first and second isolation members 46, 48 attenuates and therefore minimizes noise transmission through tube retention fastener 10. Additional webs 54 and body cavities 56, 58 are created between first and second semi-circular shaped sleeves 50, 52 and either first or second end walls 14, 18 or bottom wall 16.

Tube retention fastener 10 provides for between approximately 70 to 90 percent circumferential encapsulation of first and second tubes 20, 21 by the first and second isolation members 46, 48. This is accomplished by fixing first and second isolation members 46, 48 for the entire arc length of first and second semi-circular sleeves 50, 52, and by further providing for free extending portions of the material of first and second isolation members 46, 48 out to connections with the free ends of deflecting wings provided as retention means for first and second tubes 20, 21. According to several aspects, a first free extending portion 60 extends through a first wing receiving cavity 61 to a free end 62 of a first deflecting wing 64 and is fixedly connected to the free end 62 at a first contact end 66. Free end 62 of first deflecting wing 64 includes at least one and according to several aspects first and second teeth 68, 70 which increase a surface area of free end 62 of the deflecting wing in contact with first contact end 66, the first and second teeth 68, 70 thereby defining an anti-material peeling feature.

A sleeve/body connector 71 of body 12 integrally connects semi-circular sleeve 50 to first end wall 14 and forms a partial boundary together with first end wall 14 for first wing receiving cavity 61. A first wing connection arm 72 integrally connects first deflecting wing 64 to first end wall 14. First wing connection arm 72, first deflecting wing 64 and first free extending portion 60 complete the boundary of first wing receiving cavity 61. A reinforcement member 74 extends outwardly from an outer face 76 of first end wall 14. Reinforcement member 74 limits outward flexing of first end wall 14 when first tube 20 is received and first deflecting wing 64 deflects.

A second free extending portion 75 defines a mirror image of first free extending portion 60, therefore the common features will be discussed in less detail herein. Second free extending portion 75 extends away from a second sleeve/body connector 78 which is integrally connected to a first internal wall 152 of body 12, shown and described in greater detail in reference to FIG. 6, and is integrally connected to semi-circular sleeve 50. According to several aspects, a second free extending portion 75 extends through a second wing receiving cavity 80 to a free end of a second deflecting wing 82 and is fixedly connected to the free end at a second contact end 84. The free end of second deflecting wing 82 includes at least one and according to several aspects first and second teeth similar to first and second teeth 68, 70 which increase a surface area of the second free extending portion 75 in contact with the second contact end 84, first and second teeth 68, 70 thereby defining a second anti-material peeling feature.

Second sleeve/body connector 78 of body 12 integrally connects semi-circular sleeve 50 to first internal wall 152 and forms a partial boundary together with first internal wall 152 for second wing receiving cavity 80. A second wing connection arm 85 integrally connects second deflecting wing 82 to first internal wall 152. Second wing connection arm 85, second deflecting wing 82 and second free extending portion 75 complete the boundary of second wing receiving cavity 80.

According to several aspects, second isolation member 48 is similar to or can be a mirror image of first isolation member 46. First and second free extending portions 86, 88 of second isolation member 48 are similar to a first and second free extending portions 60, 75 of first isolation member 46. Third and fourth deflecting wings 90, 92 are similar in design and function to first and second deflecting wings 64, 82. Each of first and second isolation members 46, 48 include a plurality of longitudinal resilient ribs 94. Free ends of the ribs 94 contact and can elastically deflect when first or second tubes 20, 21 are received by first and second isolation members 46, 48. According to several embodiments, the plurality of longitudinal resilient ribs 94 of both the first and second isolation members 46, 48 are located only in a first portion 95, 95' of the first and second isolation members 46, 48 fixed to the semi-circular sleeves 50, 52.

Tube retention fastener 10 is further provided with a connection means used to mount tube retention fastener 10 to a vehicle body or panel. A planar mount flange 96 can be positioned between first and second isolation members 46, 48. A fastener engagement portion 98 is created in planar mount flange 96 adapted to receive and engage with a fastener shown and described in better detail in reference to FIG. 2. A flange seal 100 created of the same material as first and second isolation members 46, 48 is positioned proximate to a perimeter edge 101 of mount flange 96. Flange seal 100 provides additional noise attenuation for tube retention fastener 10, and can additionally provide a fluid boundary seal where the vehicle fastener extends into fastener engagement portion 98.

Referring to FIG. 2 and again to FIG. 1, tube retention fastener 10 includes an inner face 102 of first end wall 14 which provides a maximum displacement contact for first deflecting wing 64 and first free extending portion 60 into the first wing receiving cavity 61. The first contact end 66 of first free extending portion 60 further includes a contact face 104 which can be concave in shape to match a radius of curvature of the first tube 20 when received by first isolation member 46. The position of contact face 104 is established by an arm width "C" of first wing connection arm 72, which also equals the vertical standoff distance between first deflecting wing 64 and inner face 102 when first deflecting wing 64 is deflected.

Figure 2:
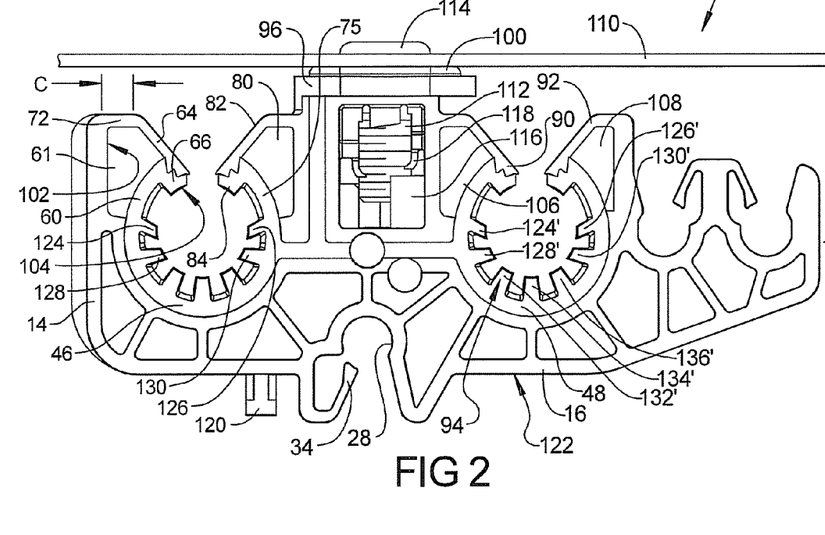
FIG. 2 is a front elevational view of the fastener of FIG. 1.

The second isolation member 48 according to several aspects can be substantially identical to the geometry of first isolation member 46, or can have different dimensions with respect to first isolation member 46. The configuration of second isolation member 48 within tube retention fastener 10 provides similar operational characteristics when second tube 21 is received by second isolation member 48. For example, a third wing receiving cavity 106 receives a rotated third deflecting wing 90 and a fourth wing receiving cavity 108 receives a rotated fourth deflecting wing 92. The third and fourth wing receiving cavities 106, 108 are therefore similar in geometry with respect to first and second wing receiving cavities 61, 80.

Figure 10:
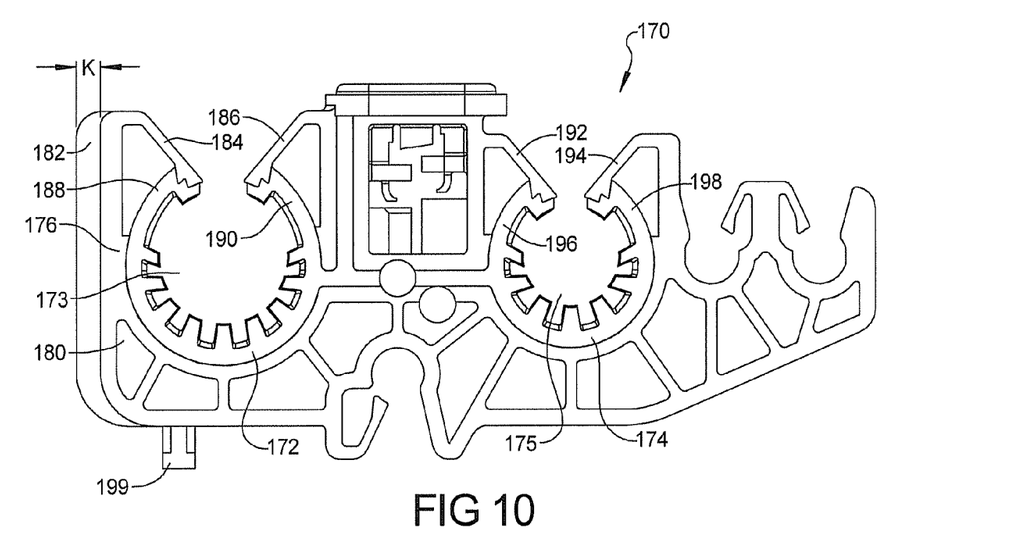
FIG. 10 is a front elevational view of the fastener of FIG. 9.

According to several aspects, at least the first and second tubes 20, 21 are inserted into the first and second isolation members 46, 48 prior to mounting tube retention fastener 10. Tube retention fastener 10 can then be releasably mounted to a vehicle panel 110 by positioning the mount flange 96 and flange seal 100 proximate to panel 110 as shown. A shank 112, such as a threaded shank of a fastener 114, is received within body 12 in a shank receiving cavity 116. A torque applied to fastener 114 engages the shank 112 with at least one and according to several aspects a plurality of shank engagement members 118 positioned within shank receiving cavity 116. The flange seal 100 when in direct contact with a face of panel 110 provides a fluid tight boundary at the location where the shank 112 extends through an aperture (not shown) created through panel 110 for the insertion of shank 112. Third tubes 22 can also be inserted at the same time as the insertion of first and second tubes 20, 21 and therefore prior to installation with panel 110, or third tubes 22 can be inserted after installation of tube retention fastener 10, specifically at the location of third retention cavity 28. A fastener distinguishing feature 120 is created at the time of molding body 12 of tube retention fastener 10. The fastener distinguishing feature 120 extends away from a lower face 122 of bottom wall 16. Fastener distinguishing feature 120 both physically and visually distinguishes similar retention fastener designs such as shown and described with respect to FIG. 10. The fastener distinguishing feature 120 when positioned in a fastener mount jig (not shown) used by the installer of the tubes will identify that the correct retention fastener is used.

The plurality of longitudinal resilient ribs 94 provided with each of the first and second isolation members 46, 48 have different sizes and different angular orientations depending on the location of the various resilient ribs. First and second ribs 124, 126, which are positioned substantially at opposite sides of the first and second isolation members 46, 48, are angled downward as viewed in FIG. 2 to limit frictional resistance during installation of the first and second tubes 20, 21. Third and fourth ribs 128, 130 are longer than first and second ribs 124, 126 and are positioned proximate to either the first or second rib 124, 126. Fifth, sixth, and seventh ribs 132, 134, 136 are positioned at a bottom portion (as viewed in FIG. 2) of the first and second isolation members 46, 48 and each have a greater length than any of the first, second, third, or fourth ribs 124, 126, 128, 130. A quantity of the longitudinal resilient ribs 94 used for either or both of the first or second isolation members 46, 48 can also vary from that shown to include more or fewer of the longitudinal resilient ribs 94.

Figure 3:
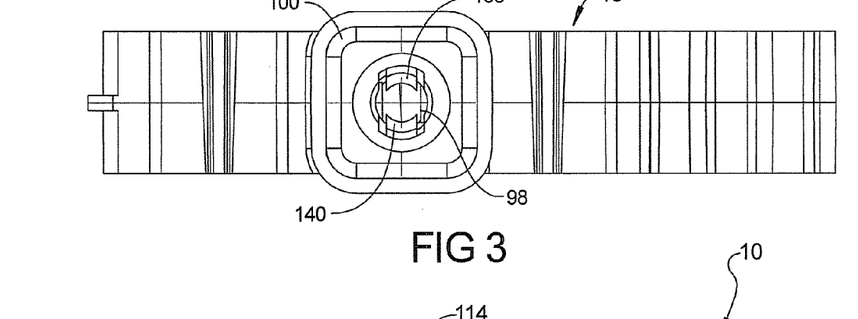
FIG. 3 is a top plan view of the fastener of FIG. 1.

Referring to FIG. 3, the fastener engagement portion 98 of tube retention fastener 10 can further include each of a first and a second oppositely positioned shank guide members 138, 140. The first and second shank guide members 138, 140 axially align the shank 112 shown and described in reference to FIG. 2 to properly engage with the individual shank engagement members 118. A spacing between the first and second shank guide members 138, 140 can also be predefined to match a root diameter of the threads provided on shank 112.

Figure 4:
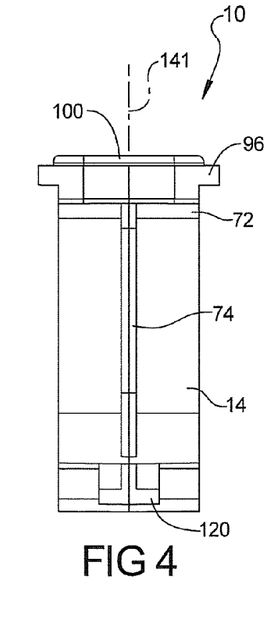
FIG. 4 is an end elevational view of the fastener of FIG. 1.

Referring to FIG. 4, the reinforcement member 74, the flange seal 100, the mount flange 96, and the fastener distinguishing feature 120 can each be coaxially aligned with respect to a body central axis 141. This insures a consistent positioning and consistent body width for tube retention fasteners 10.

Referring to FIG. 5 and again to FIG. 1, each of the plurality of shank engagement members 118', 118" includes a thread engagement tip 142, which is received between the thread peaks of shank 112. Each of the first portions 95, 95' of the semi-circular sleeves 50, 52 of body 12 define individual longitudinal axes 144, 145 for the first and second isolation members 46, 48 and the first and second tubes 20, 21. Each of the plurality of longitudinal resilient ribs 94 and the first and second contact ends 66, 84 of both the first and second isolation members 46, 48 are directly contacted by one of the first or second tubes 20, 21 when the tubes are fully received within the first and second isolation members 46, 48. In order to further help retain the first and second isolation members 46, 48 within the semi-circular sleeves 50, 52, each of the first portions 95, 95' of the semi-circular sleeves 50, 52 define an arc of rotation a which is greater than ninety degrees to resist pullout of the first or second isolation members 46, 48.

Figure 5:
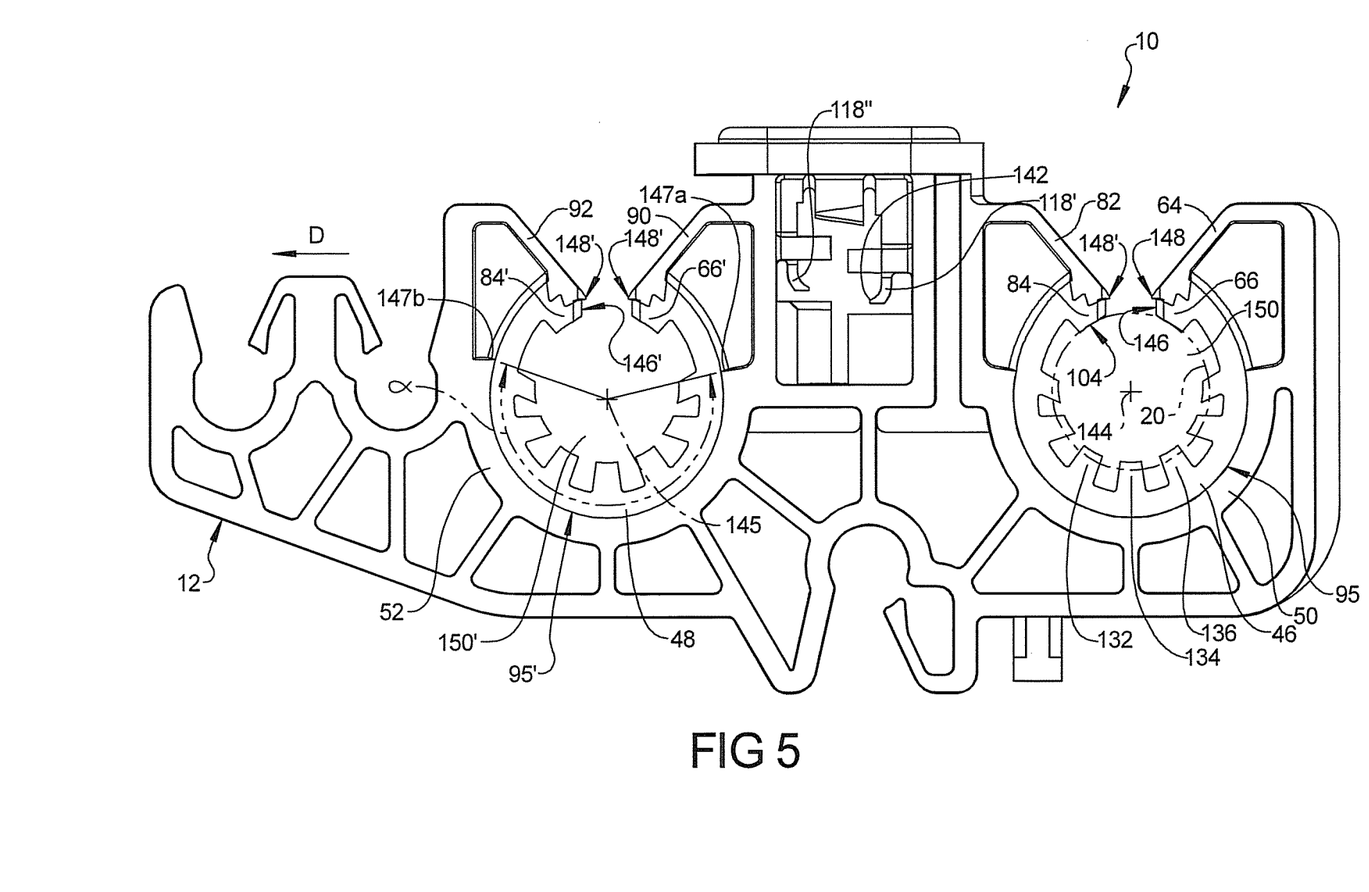
FIG. 5 is a rear elevational view of the fastener of FIG. 1.

As the first and/or second tubes 20, 21 are inserted into the first and second isolation members 46, 48 the first and second tubes 20, 21 initially encounter an extending end 148, 148' of each of the first and second deflecting wings 64, 82 and each of the third and fourth deflecting wings 90, 92. The extending ends 148, 148' of the deflecting wings extend past individual end faces 146, 146' of the first and second contact ends 66, 84, 66', 84' therefore direct contact of the first or second tubes 20, 21 occurs against the rigid material of body 12 and not directly against the softer or resilient material of the first and second isolation members 46, 48. This further helps to reduce the frictional contact between the first and second tubes 20, 21 and the material of first and second isolation members 46, 48 during tube installation, thereby further reducing the possibility of tearing the softer material of the first or second isolation members 46, 48 away from the individual deflecting wings. Direct contact between the first and second tubes 20, 21 and each of the contact faces 104 thereafter prevents the removal of either first or second tube 20, 21 from their installed positions within tube receiving longitudinal cavities 150, 150' defined by the first and second semi-circular sleeves 50, 52.

Figure 6:
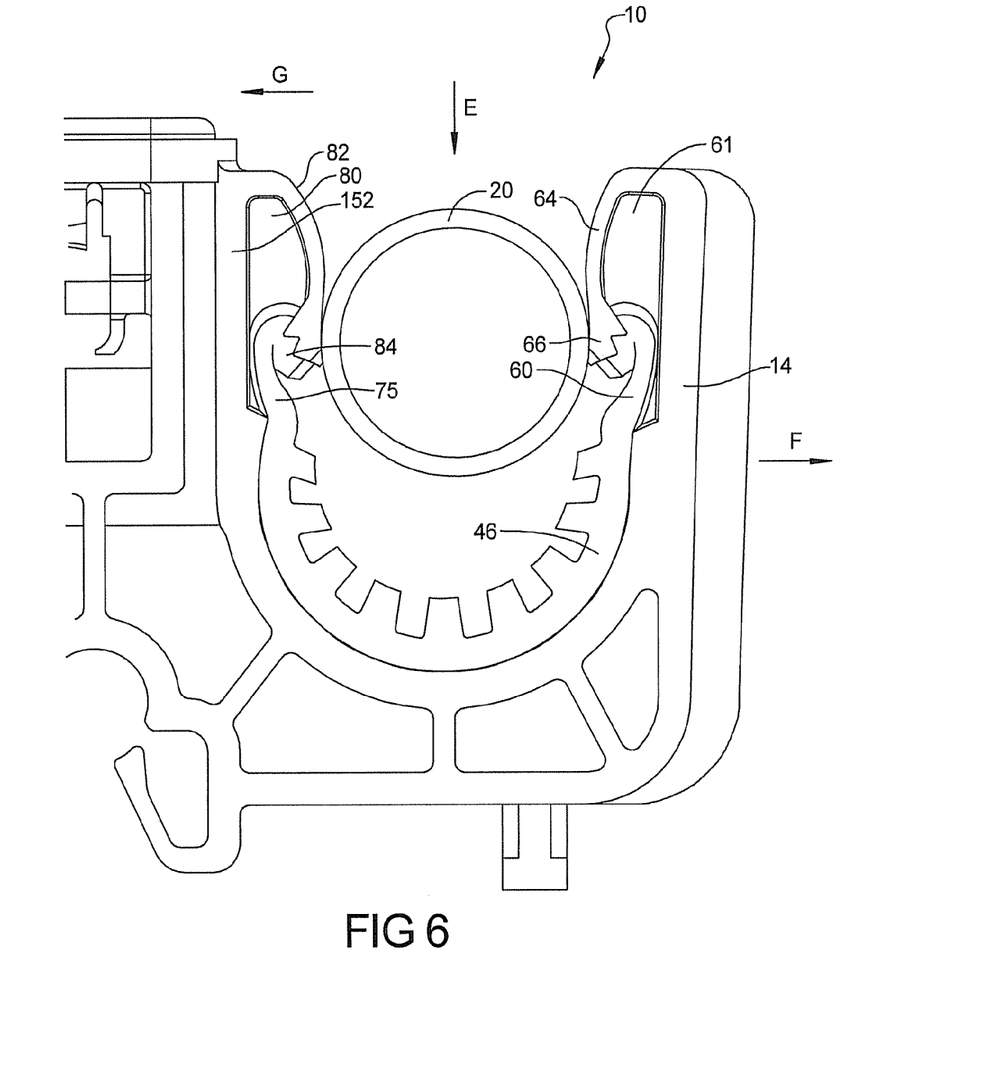
FIG. 6 is a partial rear elevational view of the fastener of FIG. 1 showing a tube in a partially installed position.

Referring to FIG. 6, an exemplary depiction of the opposite deflection of first and second deflecting wings 64, 82 that occurs during installation of first tube 20 is shown. At the maximum deflected position shown for first and second deflecting wings 64, 82, the first and second free extending portions 60, 75 together with a thickness of the first and second deflecting wings 64, 82 in a side-to-side orientation, substantially fill each of the first and second wing receiving cavities 61, 80. First tube 20 is inserted in a tube installation direction "E" which directly results in an elastic deflection of both first deflecting wing 64 and first free extending portion 60 in a first wing deflection direction "F", and an opposite elastic deflection of second deflecting wing 82 and second free extending portion 75 in a second wing deflection direction "G". This elastic deflection creates a biasing force which acts oppositely with respect first and second wing deflection directions "F", "G". The first free extending portion 60 deflects until it directly contacts first end wall 14, and second free extending portion 75 elastically deflects until it directly contacts first internal wall 152. As previously noted, the spacing or dimensions of first and second wing receiving cavities 61, 80 are predetermined to accommodate the thickness of the deflecting wings and free extending portions during this maximum deflection condition.

Figure 7:
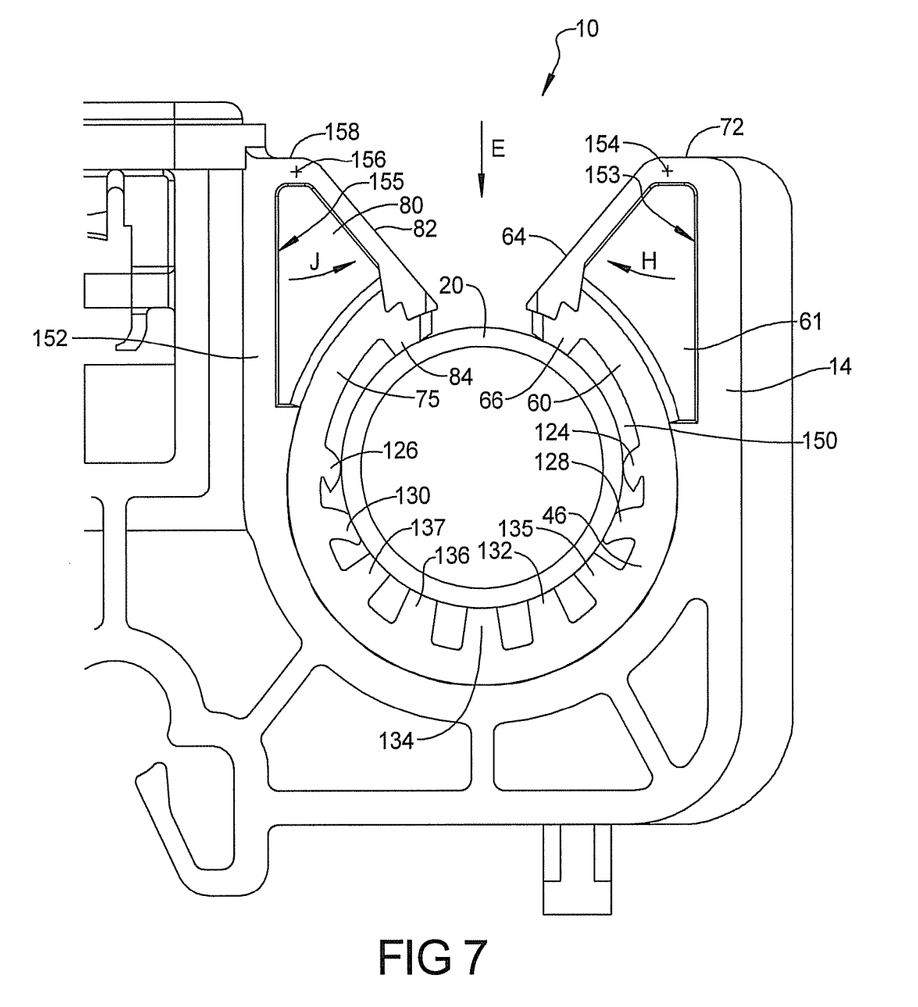
FIG. 7 is the partial rear elevational view of FIG. 6 showing the tube in a fully installed position.

Referring to FIG. 7 and again to FIG. 6, first tube 20 is shown following complete insertion in the tube installation direction "E" into the tube receiving longitudinal cavity 150. At this time, the first tube 20 directly contacts each of the individual resilient ribs including first, second, third, fourth, fifth, sixth, and seventh ribs 124, 126, 128, 130, 132, 134, 136. In addition and according to several aspects, eighth and ninth ribs 135, 137, which are optionally provided, are also directly contacted by first tube 20. The biasing force created during the elastic deflection of first deflecting wing 64 and first free extending portion 60 acts to displace these components in a first wing return arc of rotation "H" back to the non-deflected condition shown. This elastic biasing force moves the first free extending portion 60 away from contact with an end wall inner face 153 of first end wall 14 and rotates the first deflecting wing 64 with respect to a first wing axis of rotation 154. In a similar but opposite rotation, the second free extending portion 75 moves away from contact with an internal wall outer face 155 of first internal wall 152 and the second deflecting wing 82 rotates in a second wing return arc of rotation "J" with respect to a second wing axis of rotation 156. By allowing the first and second contact ends 66, 84 of the first and second free extending portions 60, 75 to be freely received within the first and second wing receiving cavities 61, 80, the forces tending to pull the first and second contact ends 66, 84 away from their respective deflecting wing is reduced, thereby maximizing an available surface area of the first and second contact ends 66, 84 in contact with first tube 20 in the fully installed position shown.

Figure 8:
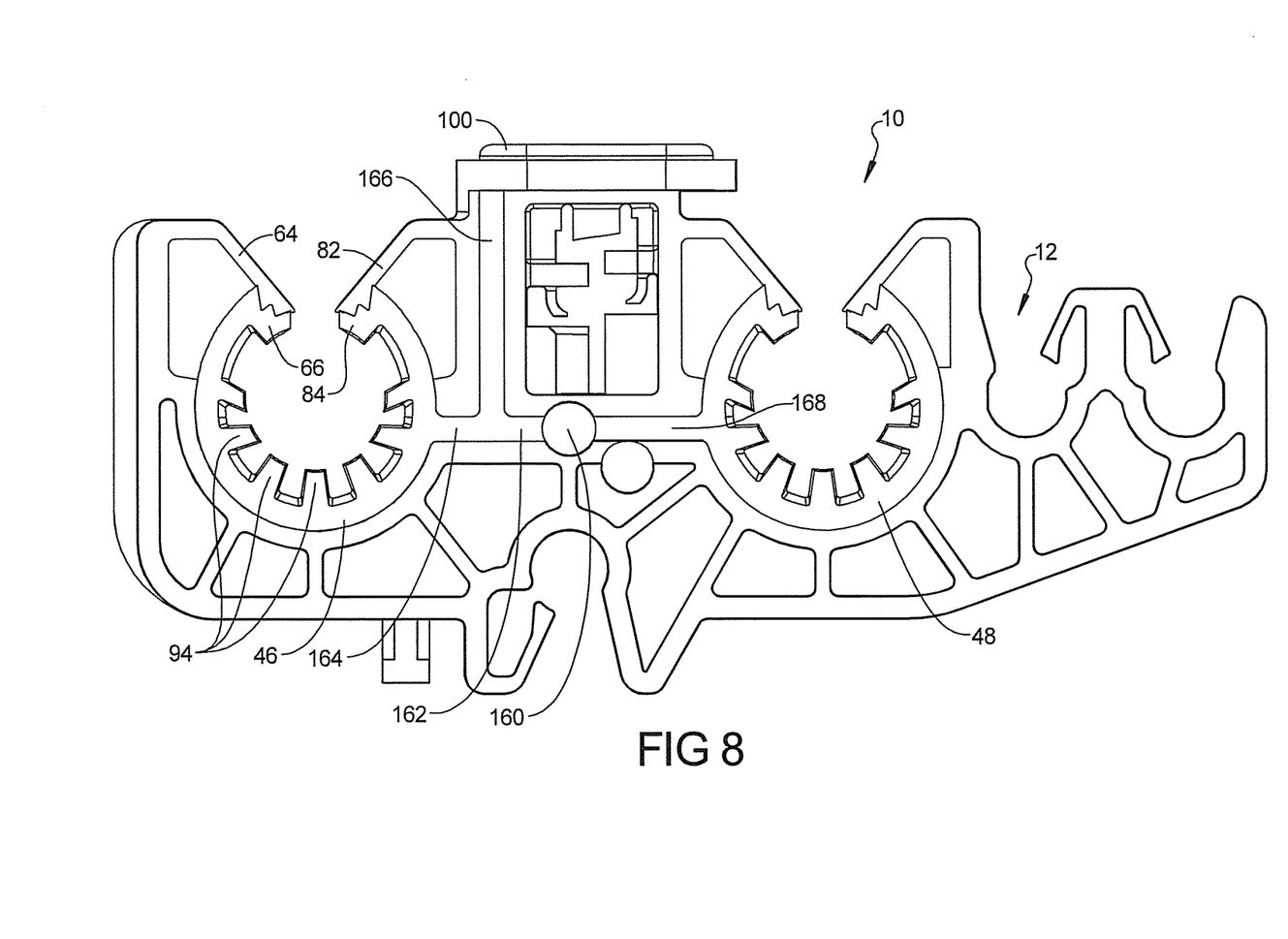
FIG. 8 is a front elevational view similar to FIG. 2.

Referring to FIG. 8 and again to FIGS. 1 and 2, the resilient material of first and second isolation members 46, 48 and of flange seal 100 is injected in a second molding shot after a first molding shot creating body 12 is completed. The softer resilient material is injected through an injection location or port 160 and moves to fill each of the subsequent positions of the first and second isolation members 46, 48 and the flange seal 100 through a series of channels created in body 12. From injection location 160, the material is directed via a first inlet channel 162 to a channel first branch 164, thereby creating first isolation member 46. Material is also simultaneously directed by a channel second branch 166 communicating with first inlet channel 162 to create the flange seal 100. Also at this time, material injected through injection location 160 is also directed via a second inlet channel 168 to create the second isolation member 48. The softer resilient material of the isolation members and flange seal is injected while the material of body 12 is still at an elevated temperature, therefore integral bonding or direct physical connection occurs between the softer resilient material and the polymeric material of body 12 within a mold (not shown) used to create tube retention fastener 10. The need for adhesives or other bonding agents to bond or fix the softer resilient material to body 12 is therefore not required.

Referring to FIG. 9 and again to FIG. 1, according to additional aspects, a tube retention fastener 170 is modified with respect to tube retention fastener 10 but provides many similar components; therefore, only the differences will be further discussed herein. Tube retention fastener 170 includes a first isolation member 172 and a second isolation member 174. The first isolation member 172 is larger than the corresponding first isolation member 46 and therefore can receive a larger diameter tube. The second isolation member 174 can be substantially equal to or smaller than the second isolation member 48. Due to the larger diameter tube receiving size of first isolation member 172, a sleeve/body connector 176 is larger than the corresponding sleeve/body connector 71 of tube retention fastener 10. The larger sleeve/body connector 176 created in a first end wall 178 of tube retention fastener 170 therefore reduces the space envelope of a corresponding end wall body cavity 180 such that end wall body cavity 180 is smaller than the corresponding end wall body cavity 58 of tube retention fastener 10.

Figure 9:
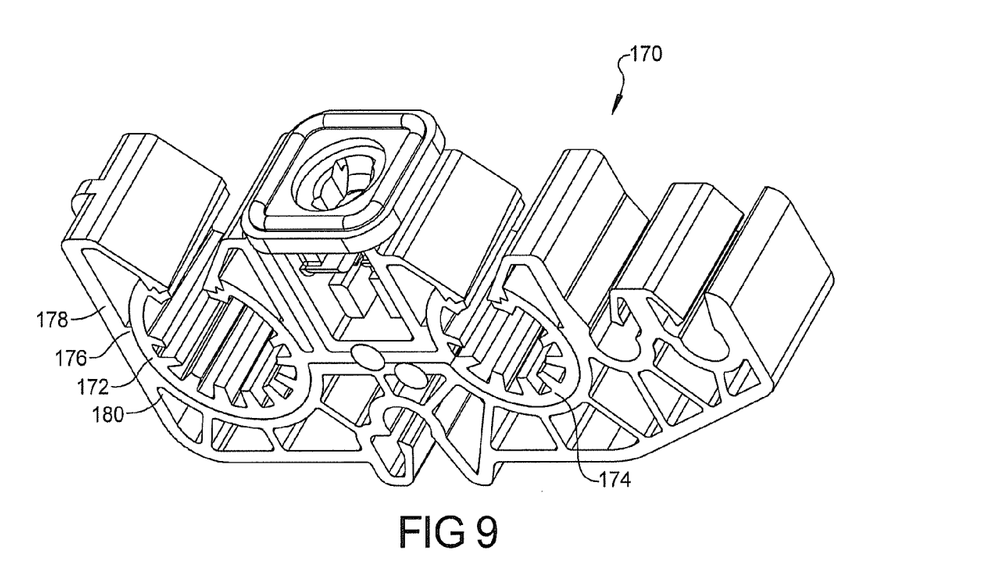
FIG. 9 is a right front perspective view of a second embodiment of a tube retention fastener according to the present disclosure.

Referring to FIG. 10 and again to FIGS. 9 and 1, a reinforcement member 182 provided for tube retention fastener 170 can have a greater reinforcement member width "K" than a corresponding width of reinforcement member 74 of tube retention fastener 10 due to the increased diameter of the tube received by first isolation member 172 and a correspondingly larger deflection force absorbed by first end wall 178. First and second deflecting wings 184, 186 can be longer than the corresponding first and second deflecting wings 64, 82 of tube retention fastener 10 to accommodate first and second free extending portions 188, 190 of first isolation member 172. Similarly, the length of third and fourth deflecting wings 192, 194 can be sized to accommodate a third and fourth free extending portion 196, 198, which can vary from the corresponding sizes of second isolation member 48. First and second tube receiving cavities 173, 175 are therefore predefined by the anticipated diameter or diameter range of the tubes received by each of the first and second isolation members 172, 174. A fastener distinguishing feature 199 provided with tube retention fastener 170 is located in a different location than the corresponding location of fastener distinguishing feature 120 of tube retention fastener 10 to provide a visual and a physical difference between tube retention fastener 10 and tube retention fastener 170. A fixture (not shown) used for installation of tubing into tube retention fastener 170 will not permit the use of tube retention fastener 10 due to the different location of fastener distinguishing feature 199.

Referring to FIG. 11 and again to FIG. 1, according to additional aspects, a tube retention fastener 200 is also modified from the geometry of both tube retention fastener 10 and tube retention fastener 170; therefore, the differences alone will be hereinafter described. Tube retention fastener 200 provides only a first isolation member 202, a second isolation member 204, and a single retention cavity 205 which corresponds to the location of third retention cavity 28 of tube retention fastener 10. The first and second cavities 24, 26 as well as the other features associated with bottom wall extending portion 40 of tube retention fastener 10 have been eliminated in the design of tube retention fastener 200. Tube retention fastener 200 provides a first end wall 206 having a first reinforcement member 208 and an oppositely positioned second reinforcement member 210 created on a second end wall 212. The flange seal 100 of tube retention fastener 10 has also been eliminated in the design of tube retention fastener 200; therefore, a mount flange 214 of tube retention fastener 200 provides only a fastener engagement portion 216.

Figure 11:
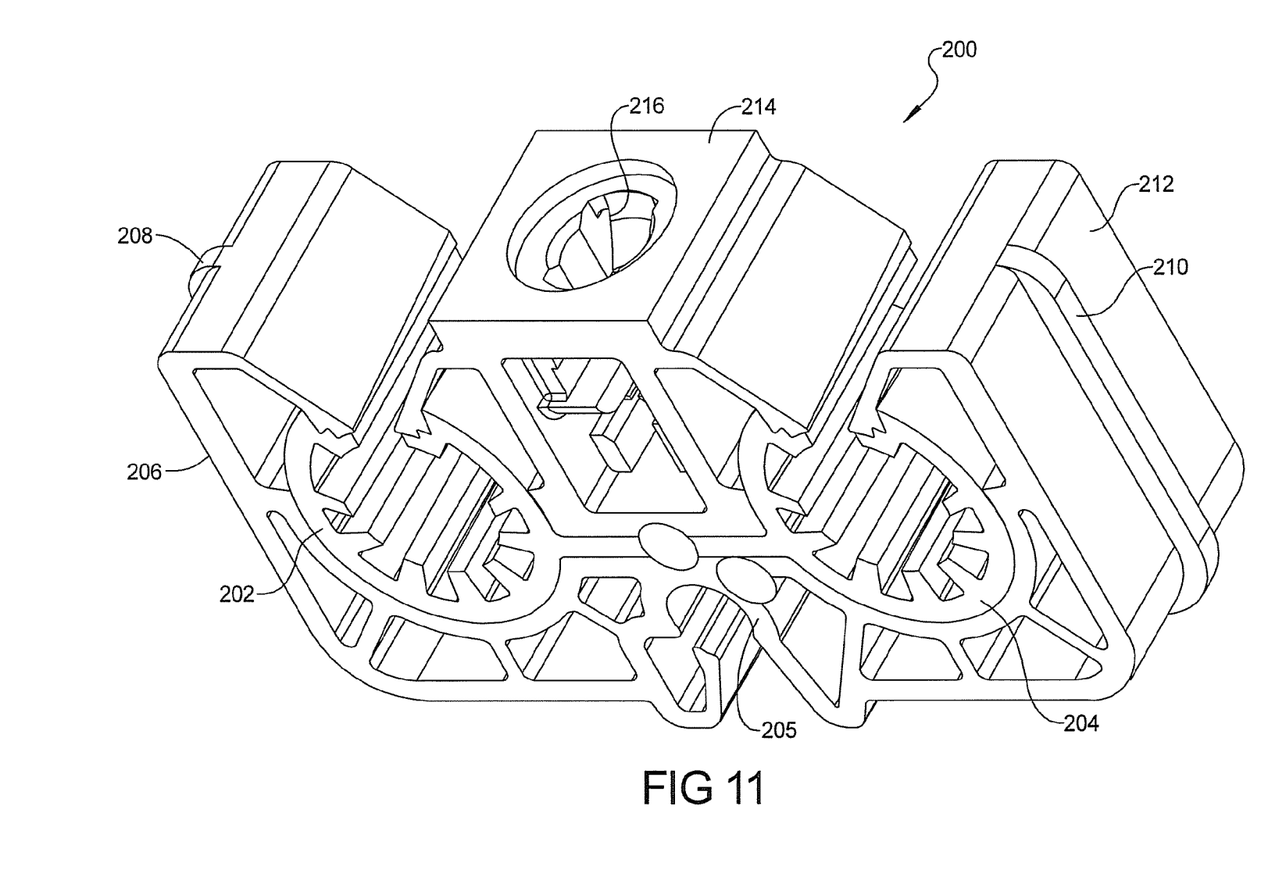
FIG. 11 is a right front perspective view of a third embodiment of a tube retention fastener according to the present disclosure.
Figure 12:
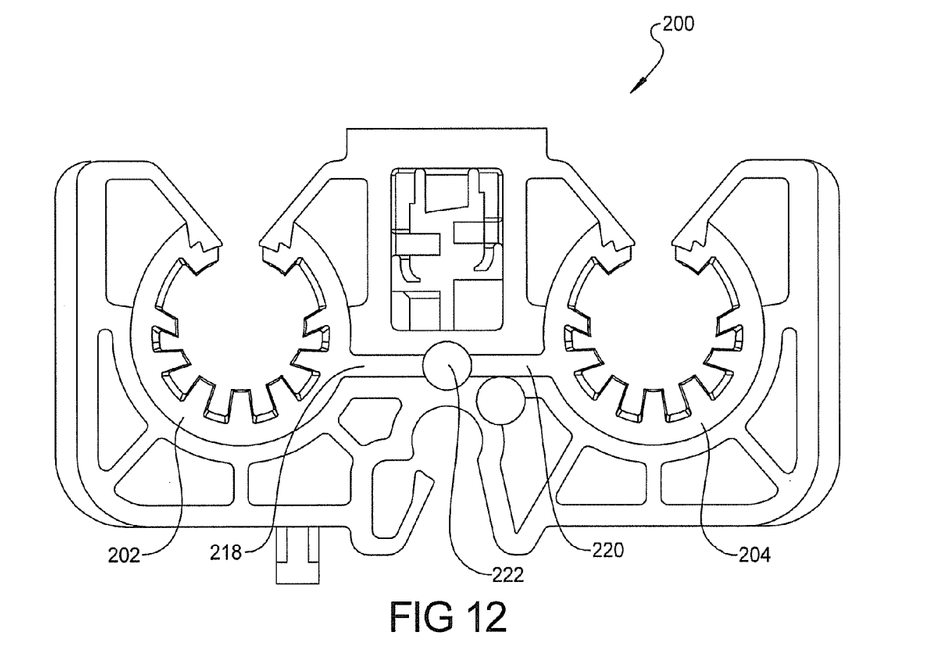
FIG. 12 is a front elevational view of the fastener of FIG. 11.

Referring to FIG. 12 and again to FIG. 11, the second shot molding process to create each of the first and second isolation members 202, 204 is simplified with respect to tube retention fastener 200 compared to tube retention fastener 10. An injection location 222 provides for only each of a first inlet channel 218 directing material to first isolation member 202 and a second inlet channel 220 directing material to second isolation member 204.

Figure 13:
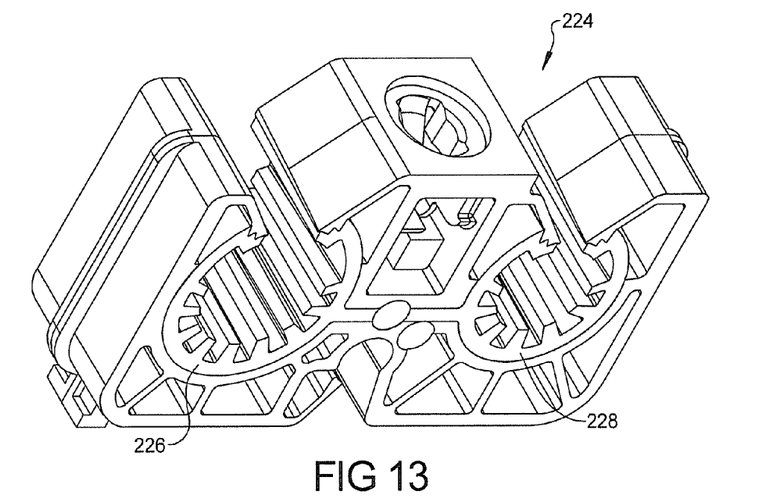
FIG. 13 is a left front perspective view of a fourth embodiment of a tube retention fastener according to the present disclosure.
Figure 14:
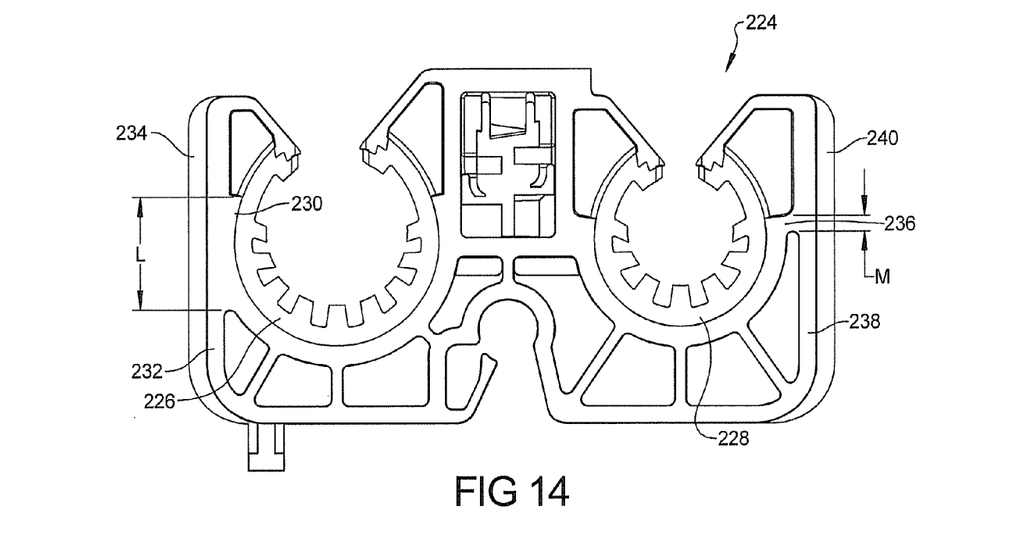
FIG. 14 is a front elevational view of the fastener of FIG. 13.

Referring to FIG. 13 and again to FIG. 11, a tube retention fastener 224 according to several aspects is modified from tube retention fastener 200 to provide for a larger diameter capacity first isolation member 226 and a smaller diameter capacity second isolation member 228. Due to the larger diameter range of tubes received by first isolation member 226 and the greater body strength required to retain the larger diameter tube, a sleeve/body connector 230 of a first end wall 232 has a first connector thickness "L" which is greater than a corresponding second connector thickness "M" of a sleeve/body connector 236 created in an opposed second end wall 238. A first reinforcement member 234 of tube retention fastener 224 can also have a greater width or thickness than a corresponding second reinforcement member 240 again due to the increased diameter tube retained by first isolation member 226 compared to the smaller diameter tube retained by second isolation member 228.

Tube retention fasteners of the present disclosure offer several advantages. By providing free extending portions 60, 75, 188, 190, 196, 198 of a resilient material isolation member, a resistance to deflection which occurs during receipt of a tube or cable is reduced, and the potential for the resilient material to peel away from the harder plastic material of the body is also reduced. By providing wing receiving cavities 61, 80 which are sized to receive both a deflecting wing and the free extending portion, the softer material of the free extending portion is not crushed or peeled during insertion of the tube or cable. By further providing teeth such as first and second teeth 68, 70 at free ends of the deflecting wings which are coupled to the resilient material of the contact ends 66, 84 a surface area of contact at this joint is increased, thereby further reducing the potential for the resilient material to peel away from the deflecting wing. The isolation members of the present disclosure can also be scaled up or down to provide a range of tube sizes that can be retained by tube retention fasteners of the present disclosure.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tube retention fastener, comprising:
a body of a polymeric first material, the body including:
first and second walls;
a semi-circular sleeve defining a longitudinal cavity between the walls; and
first and second deflecting wings connected to the first and second walls respectively and directed toward a longitudinal axis of the longitudinal cavity in a non-deflected condition;
an isolation member of an elastically resilient second material including:
a first portion fixed to the semi-circular sleeve;
wherein the first portion comprises first and second contact end fixed to the first and second deflecting wings respectively; and
first and second free extending portions each positioned between and freely extending between the first portion and one of the first and second contact ends; and
each of the first and second deflecting wings includes first and second teeth to increase a surface area of the first and second deflecting wings in contact with the first and second contact ends.

2. The tube retention fastener of claim 1, wherein the body further includes first and second wing connection arms each extending orthogonally from one the first and second walls, each fixed to one of the first or second deflecting wings.

3. The tube retention fastener of claim 2, wherein the first and second deflecting wings are rotatable with respect to the first and second wing connection arms and are elastically deflectable into individual ones of a first and second wing receiving cavity each positioned outward of one of the first or second wing connection arms.

4. The tube retention fastener of claim 1, further including a first wing receiving cavity created between the first deflecting wing and the first wall and a second wing receiving cavity created between the second deflecting wing and the second wall in the non-deflected condition, wherein the first and second deflecting wings, the first and second contact ends and the first and second free extending portions are elastically deflected into one of the first or second wing receiving cavities when a tube is positioned between the first and second deflecting wings.

5. The tube retention fastener of claim 4, wherein the first and second deflecting wings, the first and second contact ends and the first and second free extending portions return elastically from the first and second wing receiving cavities to the non-deflected condition when the tube is received in the longitudinal cavity.

6. The tube retention fastener of claim 1, wherein the isolation member includes a plurality of longitudinal resilient ribs only in the first portion fixed to the semi-circular sleeve.

7. The tube retention fastener of claim 1, wherein the contact end of each of the first and second free extending portions extends toward a longitudinal axis of the longitudinal cavity.

8. The tube retention fastener of claim 1, wherein the semi-circular sleeve defines an arc length greater than 90 degrees thereby resisting removal of the isolation member from the semi-circular sleeve.

9. A tube retention fastener, comprising:
a body of a polymeric first material, the body including:
first and second walls;
a semi-circular sleeve defining a longitudinal cavity between the walls;
first and second deflecting wings connected to the first and second walls respectively, each having a free end directed toward a longitudinal axis of the longitudinal cavity in a non-deflected condition, each free end including first and second teeth; and
an isolation member of an elastically resilient second material having:
a first portion fixed to the semi-circular sleeve;
a plurality of longitudinal resilient ribs directed toward the longitudinal axis of the longitudinal cavity and located only in the first portion; and
first and second free extending portions each freely extending from the first portion and fixed to the first and second teeth of the free end of the first and second deflecting wings respectively, and positioned such that a tube entering the longitudinal cavity between the first and second deflecting wings initially contacts the first and second deflecting wings before contacting the first and second free extending portions.

10. The tube retention fastener of claim 9, further including extending ends of the deflecting wings extending past individual end faces of first and second contact ends of the first and second deflecting wings which allow direct contact of a tube entering between the first and second deflecting wings against the first and second deflecting wings but not directly against the resilient material of the first and second isolation members.

11. The tube retention fastener of claim 9, further including a first wing receiving cavity created between the first deflecting wing and the first wall and a second wing receiving cavity created between the second deflecting wing and the second wall in the non-deflected condition.

12. The tube retention fastener of claim 11, wherein the first free extending portion and the first deflecting wing elastically deflect into the first wing receiving cavity in a deflected condition and the second free extending portion and the second deflecting wing elastically deflect into the second wing receiving cavity in the deflected condition.

13. The tube retention fastener of claim 9, wherein the isolation member further includes first and second contact ends individually fixed to one of the first and second deflecting wings.

14. The tube retention fastener of claim 9, wherein the semi-circular sleeve extends through an arc length greater than 90 degrees and includes first and second arc end points, with a spacing between the first and second arc end points being less than a diameter of the isolation member thereby resisting removal of the isolation member from the semi-circular sleeve.

15. The tube retention fastener of claim 9, wherein the body further includes a first wing connection arm integrally connecting the first wall to the first deflecting wing and a second wing connection arm integrally connecting the second wall to the second deflecting wing.

16. A tube retention fastener, comprising:
a body of a polymeric first material, the body including:
first and second walls;
a semi-circular sleeve defining a longitudinal cavity between the walls;
first and second deflecting wings connected to the first and second walls respectively, each having a free end directed toward a longitudinal axis of the longitudinal cavity in a non-deflected condition; and a first wing receiving cavity created between the first deflecting wing and the first wall and a second wing receiving cavity created between the second deflecting wing and the second wall in the non-deflected condition;

an isolation member of an elastically resilient second material having:

a first portion fixed to the semi-circular sleeve;

wherein the first portion comprises first and second contact ends fixed to the free end of the first and second deflecting wings respectively; and first and second free extending portions each freely extending from the first portion to one of the first and second contact ends, the first free extending portion and the first deflecting wing elastically deflected into the first wing receiving cavity in a deflected condition and the second free extending portion and the second deflecting wing elastically deflected into the second wing receiving cavity in the deflected condition; and each of the first and second deflecting wings includes first and second teeth extending into and individually fixed to the first and second contact ends thereby increasing a surface area of the first and second deflecting wings in contact with the first and second contact ends.

17. The tube retention fastener of claim 16, wherein the body further includes:

third and fourth walls;

a second semi-circular sleeve defining a second longitudinal cavity; and third and fourth deflecting wings individually integrally connected to one of the third or fourth walls, each having a free end directed toward a longitudinal axis of the second longitudinal cavity in a non-deflected condition.

18. The tube retention fastener of claim 17, further including a second isolation member of the elastically resilient material including:

a first portion fixed to the second semi-circular sleeve;

third and fourth contact ends individually fixed to one of the third and fourth deflecting wings; and third and fourth free extending portions each positioned and freely extending between the first portion and one of the third and fourth contact ends.

19. The tube retention fastener of claim 16, wherein the isolation member includes a plurality of longitudinal resilient ribs directed toward the longitudinal cavity and located only in the first portion.

20. The tube retention fastener of claim 16, wherein the body further includes a plurality of semi-circular sleeves defining individual semi-circular sleeve longitudinal cavities, and individually including opposed deflecting wings integrally connected to individual opposed walls, each of the opposed deflecting wings having a free end directed toward a longitudinal axis of one of the semi-circular sleeve longitudinal cavities in a non-deflected condition.

* * * * *

UNITED STATES PATENT AND TRADEMARK OFFICE
CERTIFICATE OF CORRECTION

PATENT NO. : 8,733,709 B2
APPLICATION NO. : 13/324079
DATED : May 27, 2014
INVENTOR(S) : Jason A. Meyers et al.

Page 1 of 1

It is certified that error appears in the above-identified patent and that said Letters Patent is hereby corrected as shown below:

Title Page, Item (73) Assignee,

"Black & Decker Inc., Newark, DE (US)" should be -- Newfrey LLC, Newark, DE (US) --.

In the Claims,

Column 11, line 33 (Claim 2) after "one" insert -- of --.

Signed and Sealed this
Twenty-fourth Day of March, 2015

Michelle K. Lee
*Director of the United States Patent and Trademark Office*